(12) United States Patent
Wittig

(10) Patent No.: US 6,646,402 B2
(45) Date of Patent: Nov. 11, 2003

(54) FORCE REFLECTION SYSTEM

(76) Inventor: Michael B. Wittig, 355 Mariposa Ave. #5, Mountian View, CA (US) 94041

( * ) Notice: Subject to any disclaimer, the term of this patent is extended or adjusted under 35 U.S.C. 154(b) by 0 days.

(21) Appl. No.: 09/798,705

(22) Filed: Mar. 2, 2001

(65) Prior Publication Data

US 2001/0035727 A1 Nov. 1, 2001

Related U.S. Application Data

(60) Provisional application No. 60/186,550, filed on Mar. 2, 2000.

(51) Int. Cl.[7] ............................................. G05B 19/10
(52) U.S. Cl. .................... 318/567; 345/156; 74/471 XY
(58) Field of Search ............................ 318/567, 568.11, 318/568.16, 568.17, 568.2, 568.25; 345/156, 161, 184; 74/471 XY

(56) References Cited

U.S. PATENT DOCUMENTS 5,816,105 A * 10/1998 Adelstein ............... 318/568.11
5,828,197 A * 10/1998 Martin et al. ............... 318/567
5,898,599 A * 4/1999 Massie et al. .............. 345/156

* cited by examiner

Primary Examiner—Khanh Dang

(57) ABSTRACT

A force reflection system is described. A power outlet is mounted to the building structure and is connected to an electric power cable. A support frame is located in a stationary relationship relative to the building structure. A linkage mechanism has a first portion and a second portion being movable relative to the first portion. The first portion is mounted to the frame. A user interface device is secured to the second portion of the linkage mechanism. A connector is connected to the power outlet. An electric power supply link connects the connector to a supply terminal of an electric motor actuating the linkage mechanism so that the supply terminal is at a voltage level which is at least 70 percent of the voltage level of the power cable. No transformer is used but mechanisms are in place to protect a person from electrocution.

18 Claims, 7 Drawing Sheets

FORCE REFLECTION SYSTEM

CROSS-REFERENCES

Priority is claimed from provisional patent application No. 60/186,550 filed on Mar. 2, 2000.

BACKGROUND OF THE INVENTION

1). Field of the Invention

This invention relates to an actuation device of the kind used for interactive games.

2). Discussion of Related Art

Actuation devices are often used in, for example, interactive games. Forces are imparted to a hand of a person by a handle held in the hand of the person. Such a device usually includes a transformer through which power is supplied to electric motors. Transformers magnetically saturate after conveying a particular level of power, thereby limiting the power available to the attached device. In an actuation device, the power limitation of the transformer therefore limits the amount of power that can be delivered to the motors and adds additional weight, size and expense.

SUMMARY OF THE INVENTION

According to one aspect of the invention a force reflection system is provided comprising a building structure, an electric power cable, a power outlet, a support frame, a linkage mechanism, a user interface device, an electric motor, a connector, and an electric power supply link. The electric power cable is mounted to the building structure and carries the voltage having a maximum supply voltage level. The power outlet is mounted to the building structure and is connected to the electric power cable so that the electric power outlet is substantially at the voltage level of the electric power cable. The support frame is located in a stationary relationship relative to the building structure. The linkage mechanism has a first portion and a second portion being movable relative to the first portion. The first portion is mounted to the frame. The user interface device is secured to the second portion of the linkage mechanism. The user interface device has a surface shaped for contact by a body part of a person. Movement of the second portion of the linkage mechanism relative to the first portion thereof causes movement of the user interface device relative to the frame. The electric motor has a motor body, an actuating component, and an electric supply terminal. When a current is applied on the supply terminal, the actuating component is caused to move relative to the motor body. The motor is connected between two components of the frame and the linkage mechanism such that movement of the actuating component causes movement of the second portion of the linkage mechanism relative to the first portion thereof with a corresponding movement of the user interface device relative to the frame and the building structure. The connector is connected to the power outlet. An electric power supply link connects the connector to the supply terminal so that the supply terminal is at a voltage level which is at least 70%, more preferably at least 80% and more preferably at least 90%, of the maximum supply voltage level.

BRIEF DESCRIPTION OF THE DRAWINGS

The invention is further described by way of example with reference to the accompanying drawings wherein.

DETAILED DESCRIPTION OF THE INVENTION

Figure 1:
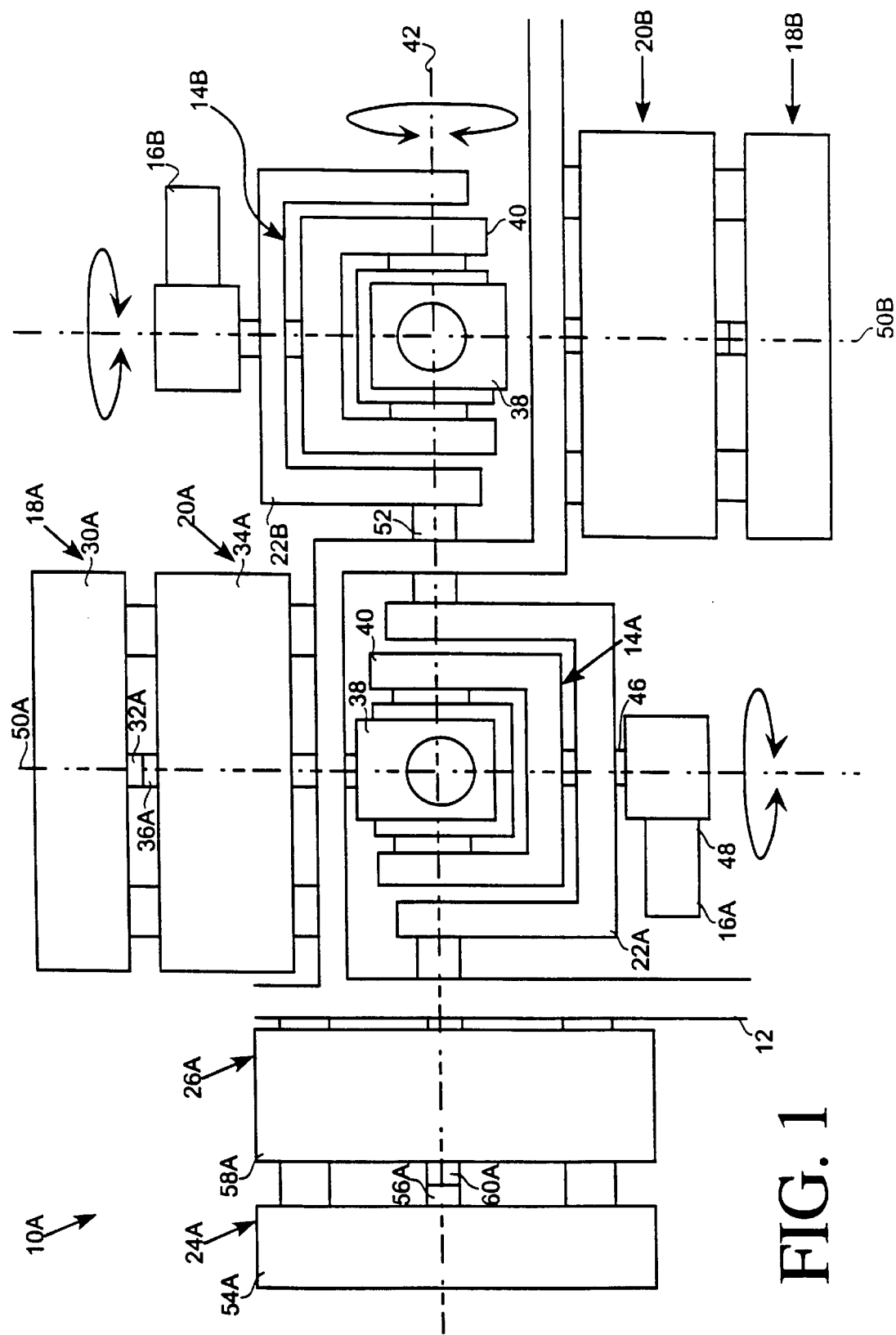
FIG. 1 is a front view of a subsystem of an actuation device according to an embodiment of the invention.

FIG. 1 of the accompanying drawings illustrates a first subsystem 10A of an actuation device, suitable for us in interactive games, according to an embodiment of the invention. The subsystem 10A includes a support frame 12, a first universal joint 14A, a second universal joint 14B, a first linkage 16A, a second linkage 16B, a first pivoting actuator motor 18A, a second pivoting actuator motor 18B, a first pivoting brake 20A, a second pivoting brake 20B, a first rotation bracket 22A, a second rotation bracket 22B, a first rotation actuator motor 24A, and a first rotation brake 26A.

The first pivoting actuator motor 18A has a first pivoting actuator body 30A, and a first pivoting actuating spindle 32A. The spindle 32A is rotatable relative to the body 30A and has lower mass than the body 30A.

The first pivoting brake 20A includes a first pivoting brake body 34A and a first pivoting brake shaft 36A. The shaft 36A extends through the body 34A and is rotatable relative to the body 34A. The shaft 36A has lower mass than the body 34A.

The body 34A is mounted to a portion of the frame 12 and the body 30A is mounted to the body 34A. The spindle 32A is coupled to the shaft 36A.

An opposing end of the shaft 36A extends through an opening in the frame 12 and is coupled to a first portion 38 of the first universal joint 14A. A second portion 40 of the universal joint 14A is secured to the first portion 38. The second portion 40 can rotate relative to the first portion 38 about a rotation axis 42 and about an axis normal to the paper and intersecting the rotation axis 42.

A pin 46 is mounted to a lower surface of the second portion 40 and a first portion 48 of the first linkage 16A is secured to the pin 46. The spindle 32A, the shaft 36A, the first and second portions 38 and 40, the pin 46, and the first linkage 16A all pivot about a vertical first pivot axis 50A. The second portion 40 together with the pin 46 and the first linkage 16A can also rotate relative to the frame 12 about the rotation axis 42. Such rotation results in a bend in the first pivot axis 50A at the rotation axis 42. As such, a lower portion of the first pivot axis 50A then extends at an angle relative to an upper portion of the first pivot axis 50A. As will be understood in the functioning of a universal joint, an orientation of the lower portion of the pivot axis 50A can be maintained even when the first linkage 16A is pivoted about the lower portion of the first pivot axis 50A.

The second pivoting actuator motor 18B, the second pivoting brake 20B, the second universal joint 14B, and the second linkage 16B have a similar construction. The motor 18B and the brake 20B are mounted to the frame 12 and the universal joint 14B and the second linkage 16B are rotated together with a spindle of the motor 18B and a shaft of the 20B about a second pivot axis 50B. The pivot axes 50A and 50B extend vertically and are spaced from one another. The universal joint 14B also allows for rotation of a second portion 40 of the universal joint 14B relative to a first portion 38 thereof about the rotation axis 42. The second linkage 16B rotates together with the second portion of the universal joint 14B about the rotation axis 42. Such rotation of the linkage 16B results in a bend of the second pivot axis 50B at the rotation axis 42. An orientation of an upper portion of the second pivot axis 50B can be maintained relative to an orientation of a lower portion of the second pivot axis 50B even when the second linkage 16B is pivoted about the upper portion of the second pivot axis 50B.

The brackets 22A and 22B are mounted to the frame 12 and are rotatable about the pivot axis 42. The bracket 22A is connected to the pin 46 so that, upon rotation of the bracket 22A, the pin 46 is rotated about the rotation axis 42. Rotation of the bracket 22A thereby causes rotation of the first linkage 16A about the rotation axis 42. The pin 46 fits in a bearing in the bracket 22A so that the bracket 22A does not interfere with pivoting of the pin 46 about the first pivot axis 50A.

Similarly, the bracket 22B is connected through a pin to the second portion 40 of the universal joint 14B and the second linkage 16B. Rotation of the bracket 22B causes rotation of the second linkage 16B about the rotation axis 42. The bracket 22B does not interfere with pivoting of the linkage 16B about the second pivot axis 50B.

The brackets 22A and 22B are connected to one another through a connection pin 52. Because of the connection between the brackets 22A and 22B, the brackets 22A and 22B rotate in unison about the rotation axis 42.

The first rotation actuator motor includes a first rotation actuator motor body 54A and a first rotation actuating spindle 56A. The first rotation brake 26A includes a first rotation brake body 58A and a first rotation brake shaft 60A. The body 58A is mounted to the frame 12. The body 54A is mounted to the body 58A and the spindle 56A is coupled to the shaft 60A. An opposing end of the shaft 60A is connected to the bracket 12A. The shafts 56A and 60A rotate about the rotation axis 42. The motor 24A is the same as the motor 18A and the motor 26A is the same as the motor 20A.

In use, the motor 18A can be operated to rotate the spindle 32A, thereby rotating the first linkage 16A about the first pivot axis 50A. The brake 20A can be operated to brake the shaft 36A, thereby braking pivoting movement of the first shaft 16A about the pivot axis 50A.

Similarly, the motor 18B can be used to pivot the second linkage 16B independently of the first linkage 16A about the second pivot axis 50B and the brake 20B can be used to brake pivoting movement of the second shaft 16B about the second pivot axis 50B.

Furthermore, the motor 54A can be operated to rotate the spindle 56A, thereby rotating the shaft 60A and the brackets 22A and 22B about the rotation axis 42. Rotation of the brackets 22A and 22B causes rotation of the linkages 16A and 16B in unison about the rotation axis 42.

Note that the relatively heavy body 30A remains stationary and only the spindle, having a lower mass, is rotated, thereby minimizing rotational inertia. Similarly, the relatively massive bodies of the motors 18B and 24A, and the brakes 20A, 20B, and 26A remain stationary while the much lower mass spindles of these motors and brakes pivot and rotate. (U.S. Pat. No. 5,625,576 discloses a system having moving bodies of motors).

Because a respective brake is used in combination with a respective motor, the motor can be of the kind that creates relatively small forces on the handle 100. Injury to a user can thereby be prevented. Nevertheless, the brake can be of the kind that can create relatively large braking forces without any danger of injury to the person. A motor that can generate such large braking forces would be relatively large and also create relatively large actuation forces which could injure a person. Because the brake can only oppose movement applied by a user for system feedback, and does not create movement itself, there is a much lower chance of injury even when using a very powerful brake.

Figure 2:
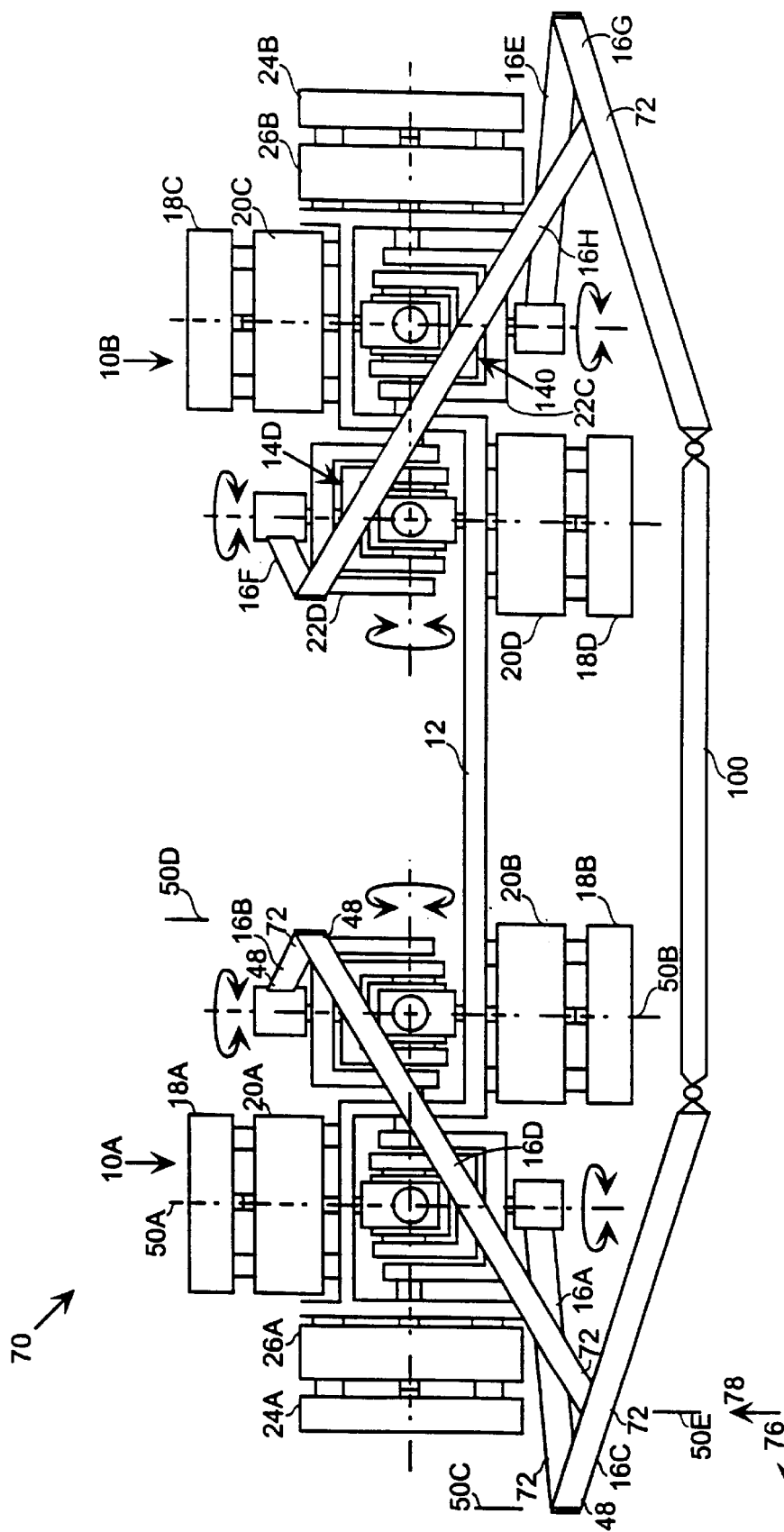
FIG. 2 is a front view of the actuation device.

FIG. 2 illustrates an actuation device 70 according to an embodiment of the invention, including the first subsystem 10A shown in FIG. 1 and a second subsystem 10B. The subsystems 10A and 10B utilize a common support frame 12. The subsystem 10B, as shown in FIG. 2, is a mirror image of the subsystem 10A.

Referring firstly to the first subsystem 10A, it further includes a third linkage 16C and a fourth linkage 16D. Each linkage 16A to D includes a respective first portion 48 and a respective second portion 72 spaced from the first portion 48 thereof. The first portion 48 of the third linkage 16C is pivotally connected to the second portion 72 of the first linkage 16A. The linkage 16C can pivot relative to the linkage 16A about a third pivot axis 50C. The first portion 48 of the fourth linkage 16D is pivotally secured to the second portion 72 of the second linkage 16B. The linkage 16B can pivot relative to the linkage 16B about a fourth vertical pivot axis 50D. The second portions 72 of the third and fourth linkages 16C and 16D are pivotally secured to one another. The third and fourth linkages can pivot relative to one another about a fifth vertical pivot axis.

In use, when viewed from above, clockwise rotation of the first and second linkages 16A and 16B causes movement of the second portion of the third linkage 16C in a direction 76. Counterclockwise rotation of the first linkage 16A and clockwise rotation of the second linkage 16B causes movement of the second portion 72 of the third linkage 16C out of the paper. When viewed from the left, counterclockwise rotation of the first and second linkages 16A and 16B causes movement of the second portions 72 of the third linkage 16C in an upward direction 78. The second portion 72 of the third linkage 16C can thus be moved in three dimensions.

The second subsystem 10B is a mirror image of the first subsystem 10A and includes a third universal joint 14C, a fourth universal joint 14D, first, second, third, and fourth linkages 16E, 16F, 16G, and 16H respectively, third and fourth pivoting actuator motors 18C and 18D respectively, third and fourth pivoting brakes 20C and 20D respectively, third and fourth rotation brackets 22C and 22D respectively, a second rotation actuator motor 24B, a second rotation brake 26B, all assembled in a manner similar to the components of the first subsystem 10A. The second subsystem 10B is also operable to move a second portion 72 of the seventh linkage 16G in three dimensions.

A handle 100 is pivotally secured to extensions of the second portions of the third and seventh linkages 16C and 16G. The handle 100 can pivot relative to the third linkage 16C in all directions, i.e. upward and downward as well as into and out of the paper. The handle 100 can also pivot relative to the seventh linkage 16G in a similar manner, i.e. upward and downward and into and out of the paper. By moving the second portions 72 of the third and seventh linkages 16C and 16G in three dimensions, the handle 100 can be moved in three dimensions. Moreover, the handle can be rotated about a vertical axis or an axis normal to the paper. Any combination of these movements is also possible.

The handle 100 has an outer surface which is shaped to be held in a hand of a person. Forces and movement of the handle 100 can be transferred to a hand of the person. The person can also move the handle, thereby rotating the spindles and shafts of the subsystems 10A and 10B, so providing system feedback.

Figure 3:
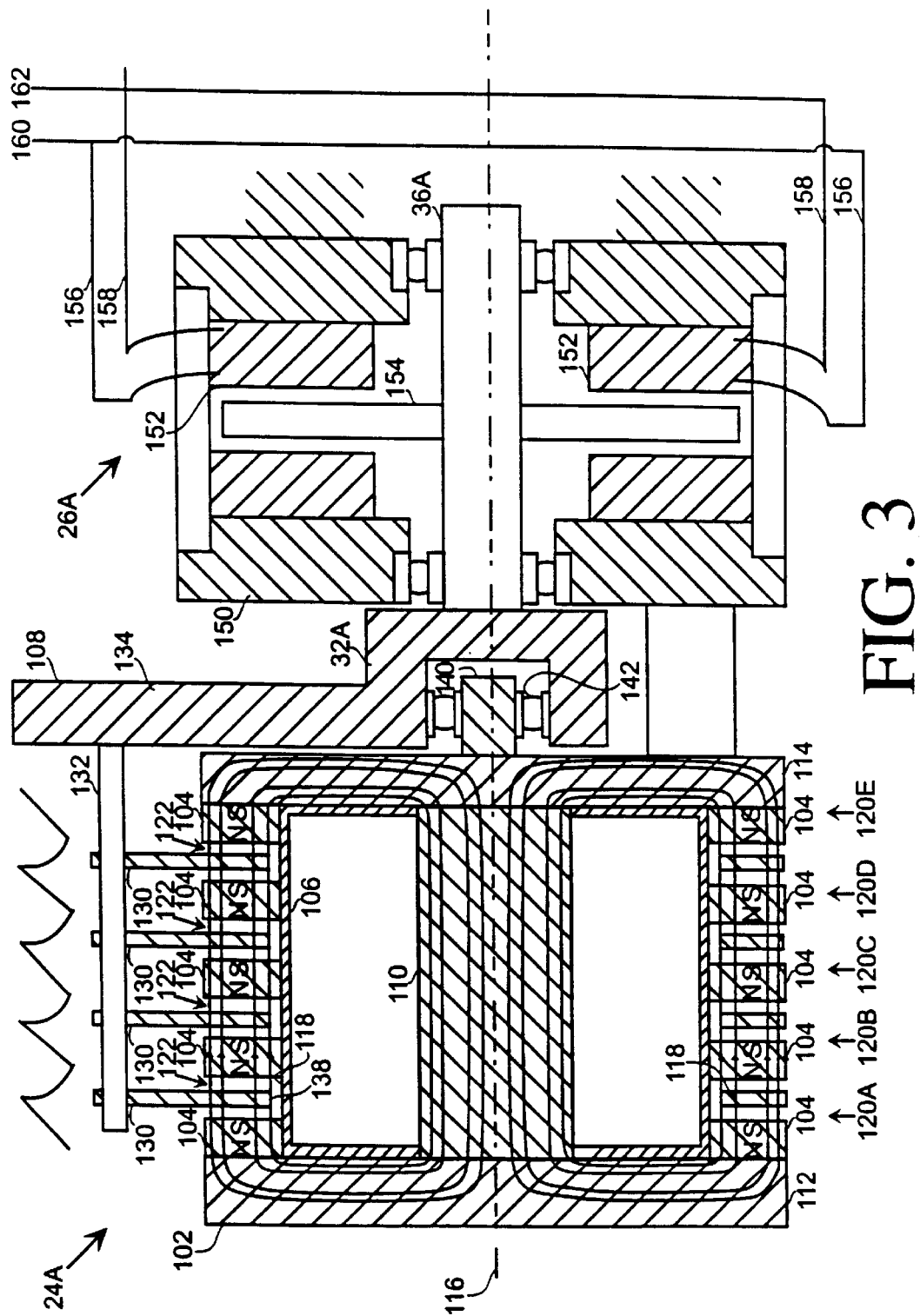
FIG. 3 is a cross-sectional side view of one motor and one brake of the actuation device.

FIG. 3 is a cross-sectional side view illustrating the motor 24A and the brake 26A. The motor 24A and the brake 26A are shown by way of example. All the motors in FIG. 2 are the same and all the brakes in FIG. 2 are the same, although this is not a requirement of the invention.

The motor 24A includes a housing 102, a plurality of stator magnets 104, a magnet support 106, and a rotor 108.

The housing 102 includes a magnetically conductive core 110 and first and second magnetically conductive end portions 112 and 114 respectively. The core 110 has a longitudinal axis 116. The magnet support 106 is made of a non-magnetic material such as aluminum or plastic. The magnet support 106 has a circular outer surface 118, and an opening therethrough through which the core 110 is inserted. The magnets 104 are secured to the surface 118.

The first and second end portions 102 are secured to opposing sides of the core 110. Each end portion 112 or 114 has a central axis coinciding with the axis 116. Each end portion 112 or 114 has a diameter which is larger than the outside of magnet support 106 so that outer edges thereof extend radially outwardly past the magnets 104.

Figure 4:
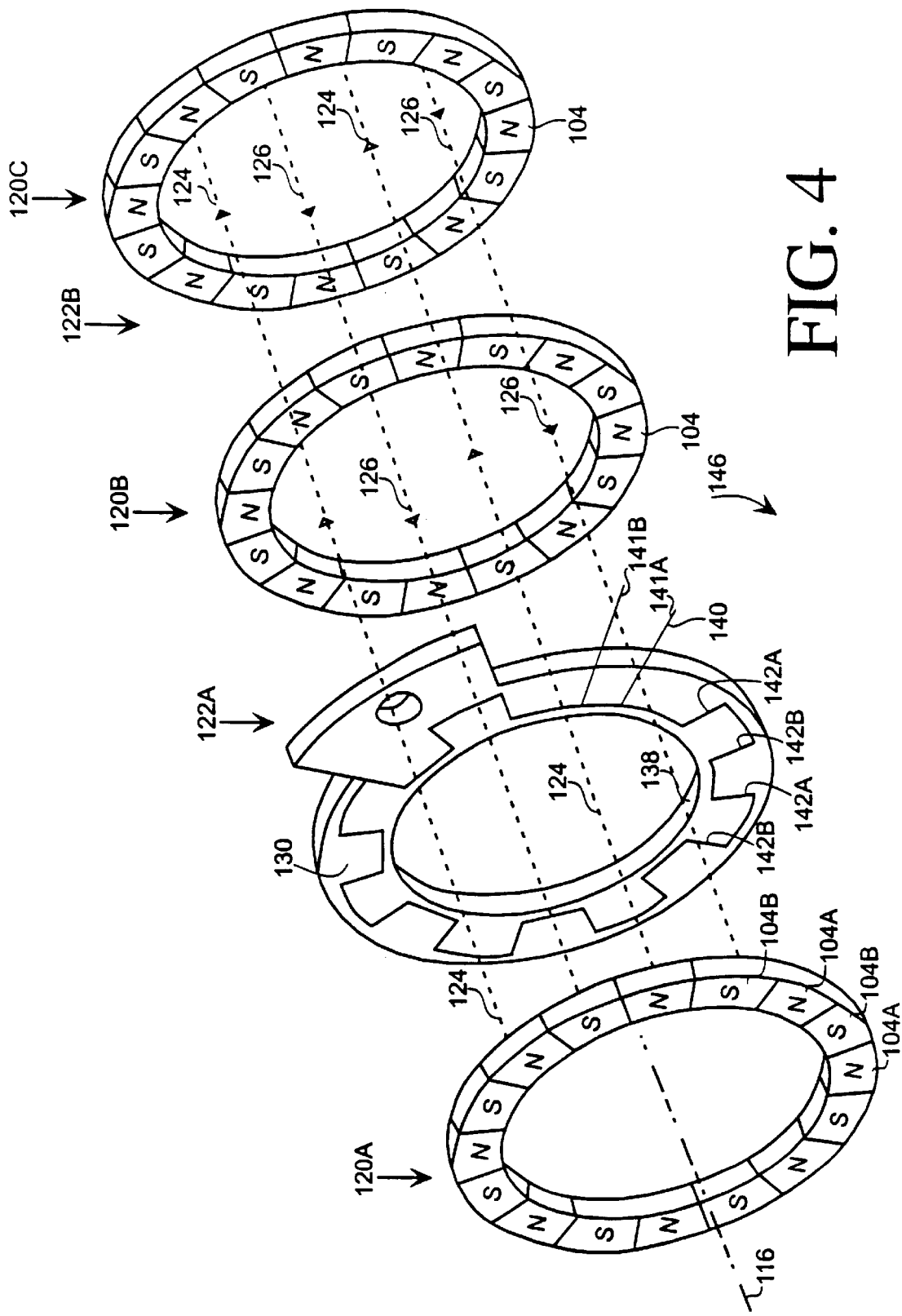
FIG. 4 is a perspective view of stator magnets and one rotor component of the motor shown in FIG. 3.

As can be seen in FIG. 4, the magnets 104 are located in a plurality of circular arrangements 120A, 120B, and 120C. Each circular arrangement 120A, 120B, or 120C has a circular row of the magnets. In a particular arrangement, for example the arrangement 120A, every odd magnet 104A has north on a first side and south on a second, axially opposing side thereof. Every even magnet has south on the first side and north on the second side.

The second arrangement 120B is axially spaced from the first arrangement 120A and the third arrangement 120C is axially spaced from the second arrangement 120B. A first rotor gap 122A is defined between the first arrangement 120A and the second arrangement 120B. A second rotor gap 122B is defined between the second arrangement 120B and the third arrangement 120C. The arrangements, 120A, 120B, and 120C are aligned with one another such that magnetic fields lines 124 are formed in one direction from a south side of odd magnets of the first arrangement 120A to a north side of odd magnets of the second arrangement 120B, and from a south side of odd magnets of the second arrangement 120B to a north side of odd magnets of the third arrangement 120C. Magnetic field lines 126 form in a opposite direction from a south side of even magnets of the third arrangement 120C to a north side of even magnets of the second arrangement 120B, and from a south side of even magnets of the second arrangement 120B to a north side of even magnets of the first arrangement 120B. A respective field line 124 or 126 is formed across a respective one of the rotor gaps 122A or 122B.

The magnets 104 are electromagnets. Each magnet includes a coil through which a current can be provided to magnetize the coil. A magnetic field is created having magnetic field lines sequentially through the arrangements 120A, B, C, D and E, whereafter the magnetic field lines return through the second portion 114, the core 110, and the first portion 112 to the magnets of the first arrangement 120A.

Referring again to FIG. 3, the rotor 108 includes a plurality of rotor components 130, a link 132, and an arm 134.

Each rotor component 130 is a planar member which in the preferred embodiment is made from a printed circuit board for low cost. The rotor component 130 has a central opening 138 which is located over the outer surface 118 of the attenuator 106. Each rotor component 130 is located within a respective rotor gap 122. A portion of each rotor component 130 also extends out of the respective rotor gap 122 and is located externally of the magnets 104. The link 132 is inserted through openings in the portions of the rotor components 130 located externally of the magnets 104. The rotor components 130 are thereby mounted to one another.

A pin 140 is secured to the second portion 114 of the housing 102. A ball bearing 142 is located on an outer surface of the pin 140. A lower end of the arm 142 has a recess 144 therein located over the ball bearing 142. The arm is thereby mounted to the pin 142 for rotation about the axis 116. The link 132 is secured to an upper end of the arm 134. All the components of the rotor 108 are thereby mounted to the housing 102 for rotation about the axis 116. In the embodiment shown, the link 132 is located externally to and rotates about the magnets 104.

FIG. 4 shows one of the rotor components 130. A respective electrical conductor 140A is formed on each rotor component 130. The conductor 140A is made of copper and has two terminals 141A and 141B over which a voltage can be applied so that a current flows therethrough. The conductor could also be made of aluminum so as to decrease the rotational inertia of rotor 130, although alunmnum has a substantially higher resistance than copper and would require additional power. The conductor 140A includes a plurality of sections 142. The sections 142 include odd sections 142A alternated by even sections 142B located in series.

When a current flows into one end of the conductor 140, the current flows radially outwardly through all the odd sections and radially inwardly through all the even sections. A current through an odd section 142A in combination with a magnetic field represented by line 124 causes a force on the respective odd section 142A which causes rotation of the odd section 142A in a direction 146 about the axis 116. The current through a respective even section 142B in combination with a magnetic field line 126 causes a force on the respective even section 142B which also causes rotation in the direction 146 about the axis 116. Utilizing a commutator (not shown in FIG. 4) the current can be reversed when the odd sections 142A are located in the magnetic field lines 126 and the even sections 142B are located in the magnetic field lines 124. As such, rotation in the direction 146 will be maintained. The current is again reversed when the odd sections 142A are located in the magnetic field lines 124, and so on.

An advantage of the motor 24A is that there is no "cogging" torque (the steps that one feels when rotating a spindle) because there is no steel or similar ferrous material in the rotor components 130 that may tend to line up with magnets. A user, when providing system feedback, will accordingly, not feel any cogging of the rotor components 130. Since the rotor components 130 are nonmagnetic, it has the disadvantage that magnetic fields lose substantial strength traveling through them just as if they were traveling through air. However, this disadvantage is overcome by making the rotor components 130 thin and making the rotor gaps 122 very small. An additional advantage of the thin rotor components 130 is a low rotational inertia. Another advantage is that more torque can be generated for its size because the magnetic field is continually reused by passing it through multiple rotors, thereby multiplying the torque generated by a single rotor. The magnetic return path created by housing 102, housing 114, and core 110 is shared by all of the rotors, instead of each rotor using a separate return path.

Figure 5:
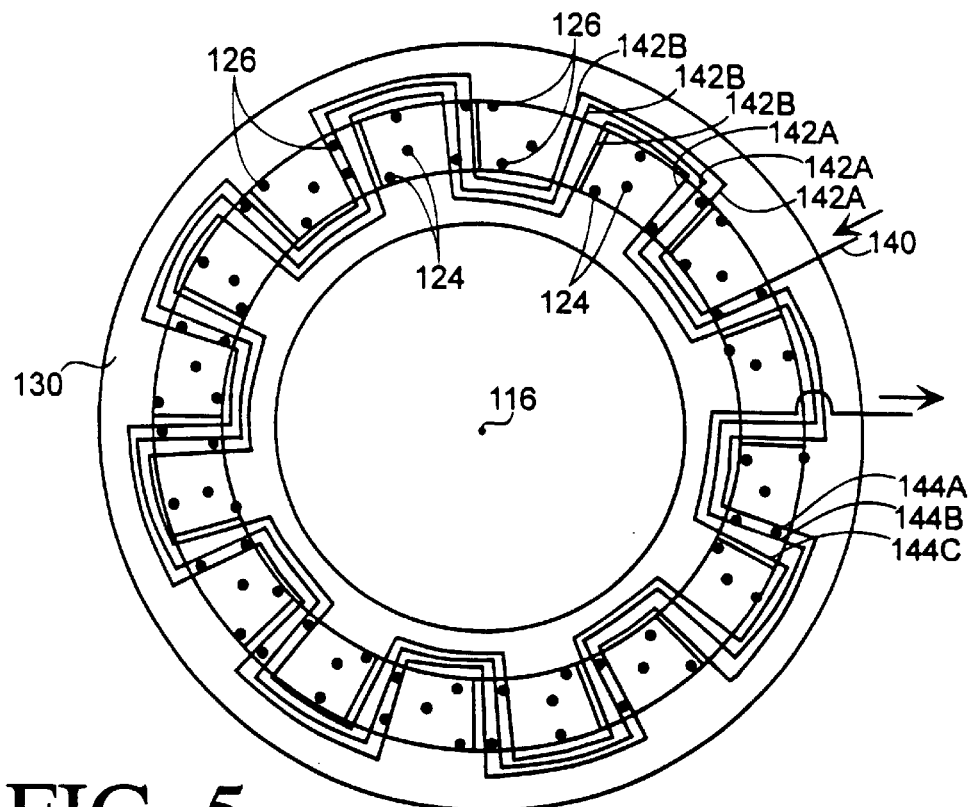
FIG. 5 is a front view of the rotor component, illustrating one conductor thereon in more detail.

FIG. 5 now illustrates the first conductor 140A in more detail. The conductor 140A has a plurality of turns 144A, 144B, and 144C in series about the axis 116. Each turn has a plurality of odd sections 142A initially carrying current radially outward while a plurality of even sections 142B carry current radially inward. All the odd sections 142A are initially located in the odd magnetic field lines 124 while all the even sections 142B are located in the even magnetic field lines 126.

In the example illustrated, there are eight magnetic fields represented by the odd magnetic field lines 124 and eight magnetic fields represented by the even magnetic field lines 126. The odd sections 142A of successive turns 144A, 144B, and 144C located in the same magnetic field are angularly spaced from one another. Because of angular spacing of the sections, a thinner rotor component 130 is provided than would be the case should the sections be axially spaced. A thinner rotor component 130 contributes greatly to propagation of magnetic field, especially in the absence of a magnetic material such as steel.

Figure 6:
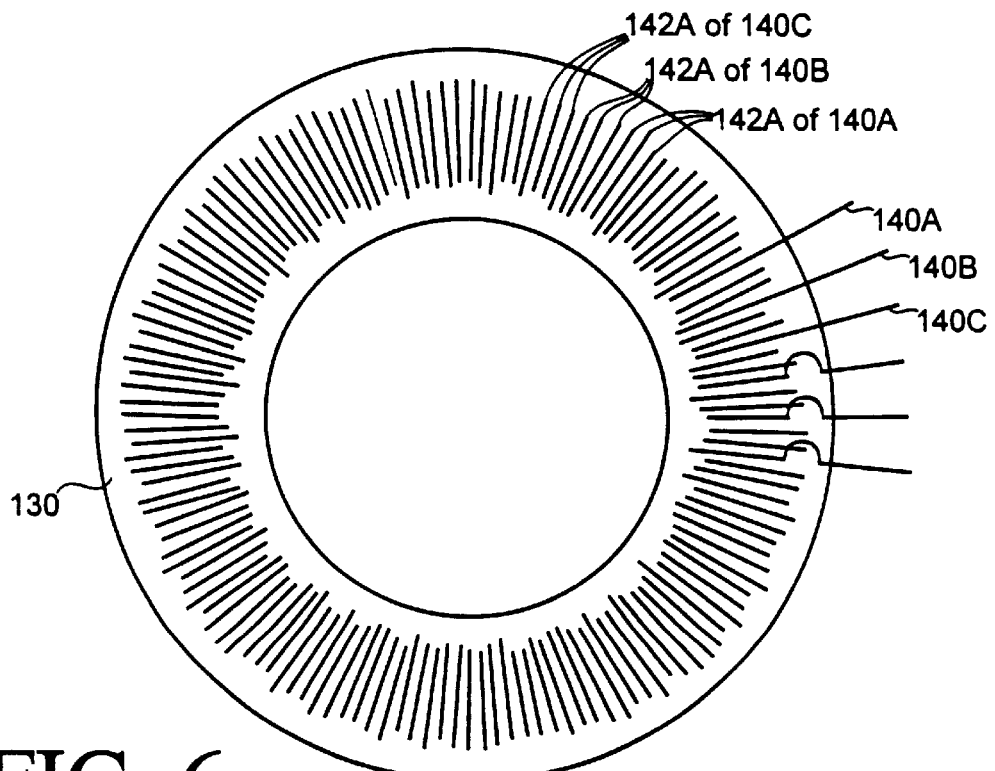
FIG. 6 is a front view of the rotor component illustrating sections of three conductors, each carrying a separate phase of current, uniformly spaced thereon.

FIG. 6 illustrates the sections 142A and 142B of the first conductor 140A and further illustrates sections 142A and 142B of two more first conductors 140B and 140C secured to the rotor component 130. Each conductor 140A, 140B, and 140C is distinct from the other and has a respective terminal to which, in use, a separate phase of power is applied. Odd sections 142A of all the conductors 140A, 140B, and 140C are located in the magnetic fields represented by the odd magnetic field lines 124. The odd sections of the conductor 140B located in the same magnetic field as odd sections of the conductor 140A are angularly spaced from the odd sections of the conductor 140A.

Figure 7:
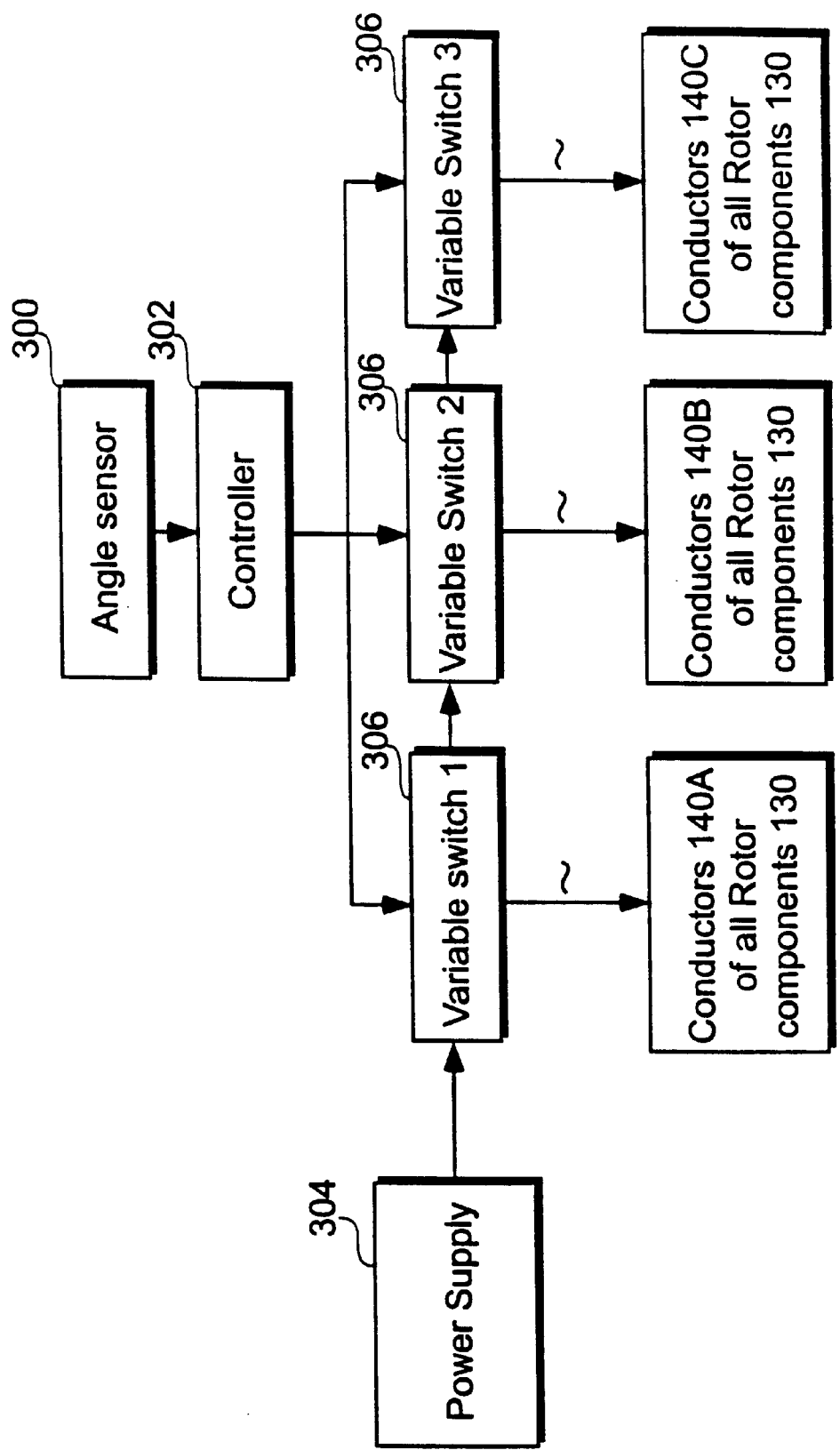
FIG. 7 is a block diagram illustrating components to comrnmutate current to the conductors.

FIG. 7 illustrates components used to commutate power supplied to the conductors 140 of the motor 24A. The components include an angle sensor 300, a controller 302, a power supply 304, and three variable switches 306. The power supply 304 supplies a voltage to all the variable switches 306. Each switch 306 is independently controlled by the controller 302. The angle sensor 300 detects an angular position of the rotor 108 and provides a signal indicative of the angular position to the controller 302. The controller 302 switches each switched sixteen times (equivalent to the number of magnetic fields or the number of magnets 104 in an arrangement 120) during one revolution of the rotor. The phases of the switches lag behind one another by their angular displacement, i.e. by ⅟₄₈ of a revolution of the rotor. Each switch 306 is controlled so as to provide a sinusoidal voltage to the respective conductors 140A, 140B, or 140C forty-eight times during a revolution of the rotor 108.

The brake 26A shown in FIG. 3 is a hysteresis brake that includes a housing 150, a plurality of electromagnets 152, the shaft 36A, and a rotor 154. The rotor 154 has a plurality of magnets (not shown) located in a circular arrangement thereon. Electric conductors 156 and 158 are connected to coils of the electromagnets 152. Each electric conductor 156 and 158 is connected to a respective terminal 160 and 162. A voltage can be applied over the terminals 160 and 162 so that a current flows in a respective one of the coils of the electromagnets 152. The electromagnets 152 are thereby magnetized. Moreover, the voltage over the terminals 160 and 162 can be varied so as to vary the strength of magnetization of the electromagnets 152.

The rotor 154 is secured to the shaft 46A and can rotate freely when the electromagnets 152 are not magnetized. There is then no torque which prevents rotation of the rotor 154. An increase in magnetization of the electromagnets 152 creates a resistance which resists rotation of the rotor 154. The spindle 32A is formed on the arm 34 of the motor 24A and the spindle 32A is connected to the shaft 36A. Any movement imparted on the shaft 36A by the motor 24A can be braked by applying a voltage over the terminals 160 and 162. The braking torque can be varied by varying the voltage over the terminals 160 and 162.

Figure 8:
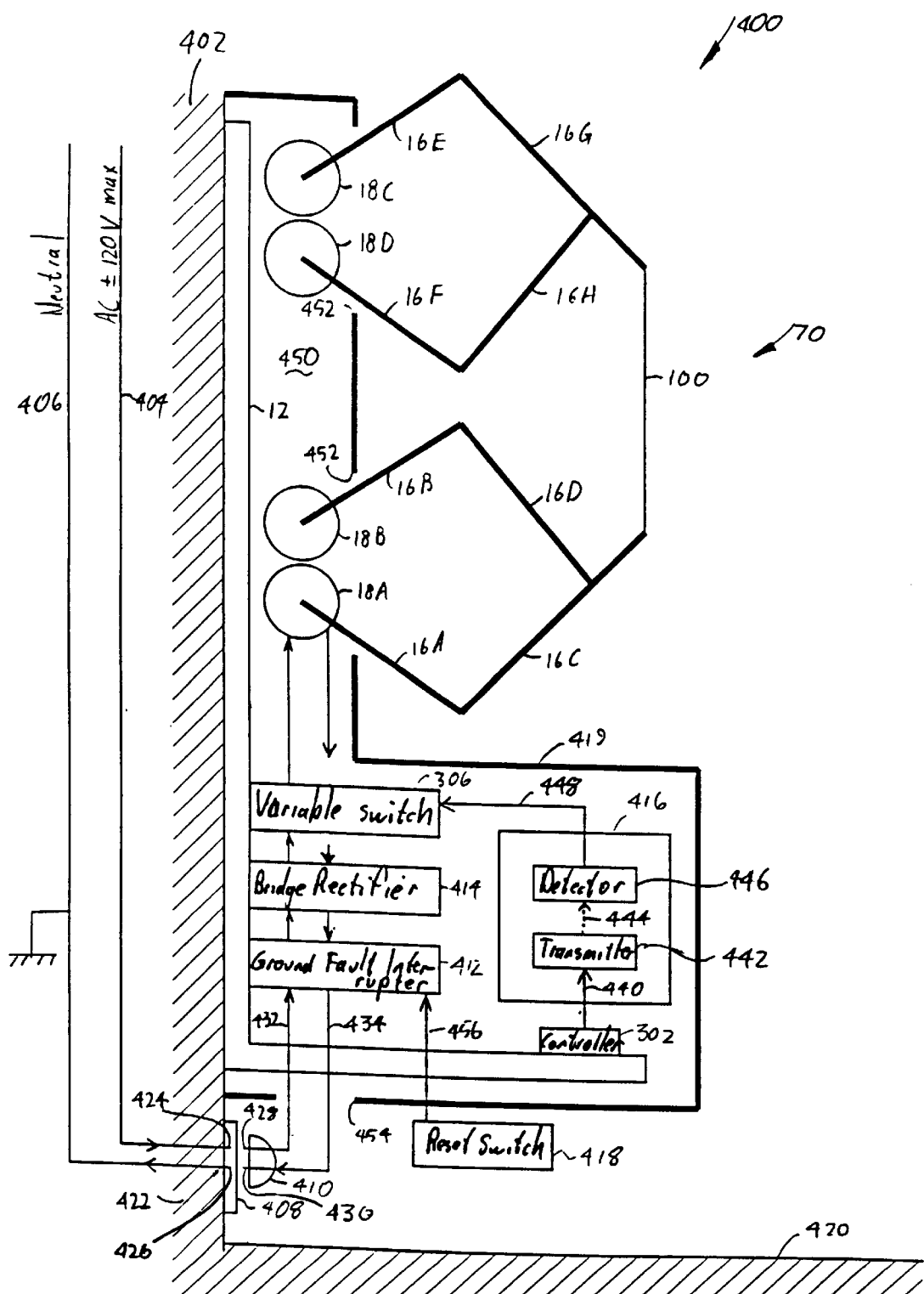
FIG. 8 is a side view of a force reflection system according to the invention.

FIG. 8 of the accompanying drawings illustrates a force reflection system 400 according to an embodiment of the invention. The force reflection system 400 includes the actuation device 70 hereinbefore described. The system 400 is designed to provide large forces to a person holding onto the handle 100 while being relatively lightweight, small in size and inexpensive due to the absence of a transformer. System 400 also provides safeguards to prevent the person holding onto the handle 100 from being electrocuted.

In addition to the actuation device 70, the system 400 further includes a building structure 402, an electric power cable 404, an electric neutral cable 406, a power outlet 408, a connector 410, a ground fault interrupter 412, a bridge rectifier 414, an optocoupler 416, a reset switch 418, and a non-conductive case 419.

The building structure 402 includes a floor 420, and a wall 422 extending outwardly from the floor 420. The power cable 402 and the neutral cable 406 are located and mounted inside the wall 422. The power cable 404 carries electric power with an alternating voltage. The voltage of the power cable 402 alternates sinusoidally and has a maximum voltage of 120 volt (V) and a minimum voltage of −120V. The voltages are based on the voltages commonly found in the United States of America. Other countries may use other voltages, such as 220V or 240V. The principles of the invention will however remain the same.

The power outlet 108 is mounted to the wall 422 and has power and neutral terminals 424 and 426 respectively. The power terminal 424 is connected to the power cable 404 and the neutral terminal 426 is connected to the neutral cable 406. The power terminal 424 is thus at the voltage of the power cable 404 and the ground terminal 426 at the voltage of the ground cable 406.

The connector 410 has power and neutral terminals 428 and 430, respectively. The connector 410 is engagable with the power outlet 408. Engagement of the connector 410 with power outlet 408 causes contact of the power terminals 424 and 428 with one another and contact of the neutral terminals 426 and 430 with one another.

The controller 302, variable switches 306, ground fault interrupter 412, bridge rectifier 416, and optocoupler 416 are all mounted to the frame 12. An electric power supply cable 432 connects the power terminal 428 with the ground fault interrupter 412. The bridge rectifier 414 is connected to the ground fault interrupter 412 and the variable switch 306 is connected to the bridge rectifier 414. An electric link is so established between the power terminal 428 and a voltage supply terminal (141A in FIG. 4) of the electric motor 18A. A respective voltages supply terminal of the electric motor 18A is connected through a respective variable switch 306 to the bridge rectifier 414. All the motors of the actuation device 70 are so connected to the bridge rectifier 414.

A respective current return terminal (141B in FIG. 4) of the electric motor 18A is connected the bridge rectifier 414 and the bridge rectifier 414 to the ground fault interrupter 412. An electric power return cable 434 connects the ground fault interrupter 412 to the neutral terminal 430 of the connector 410. An electric current return link is so established between the electric motor 18A and the neutral terminal 430. The respective terminals of each electric motor are so connected to the bridge rectifier 414.

An electric link 440 connects the controller 302 to a wireless transmitter 442 of the optocoupler 416. The transmitter 442 is a light emitting diode (LED) which transmits a wireless light signal 444. The optocoupler 416 further includes a photodetector 446. The photodetector 446 is sensitive to light emitted by the transmitter 442 so that the detector 446 detects the wireless signal 444. An electric link 448 connects the detector 446 to the variable switch 306. A respective optocoupler 416 is associated with a respective variable switch 306.

The frame 212 is located against the wall 422 and bolted to the wall 422. The frame 12 is thereby located in a stationary relationship relative to the wall 422. The nonconductive case 419 is located over the frame 12 and mounted to the frame 12. The nonconductive case 419 and the frame thereby jointly define an enclosure 450. All the electric motors of the actuation device 70 are located within the enclosure 450. The links 16A, 16B, 16E, and 16F extend through openings 452 formed in the enclosure 419. Opposing ends of the link 16A, for example, are located respectively inside the enclosure 450 and externally of the enclosure 450. The handle 100 is also located externally of the enclosure 450.

The controller 302, variable switch 306, ground fault interrupter 412, and optocoupler 416 are all also located within the enclosure 450. The electric power supply cable 432 and the electric power return cable 434 extend through an opening 454 in the enclosure 419. The connector 410 is located externally of the enclosure 450. The reset switch 418 is located externally of the enclosure 450 and is mounted to the case 419. An electric link 456 has one end connected to the reset switch 418. The electric link 456 extends through an opening in the case 419 and the opposing end thereof is connected to the ground fault interrupter 412.

In use, the connector 410 is connected to the power outlet 408. The power terminals 424 and 428 are thereby brought into contact with one another and the neutral terminals 426 and 430 are brought into contact with one another. The alternating voltage of the electric power cable 404 is supplied through the electric power cable 342 and the ground fault interrupter 412 to the bridge rectifier 414. A supply voltage to the bridge rectifier 414 alters sinusoidally with a maximum voltage of 120V and a minimum voltage of −120V. The bridge rectifier 414 converts the alternating voltage to a constant voltage of about 180V. The constant voltage is then supplied to the respective variable switch 306.

Current supplied through the power terminal 428 is the same as current through the interrupter 412 and through the rectifier 414. The current then divides up into a plurality of branches, each branch flowing to a respective switch 306 and a respective conductor (140A, B, or C in FIG. 6) of a respective motor of the actuation device 70. There are three switches per motor and a total of six motors. The current thus divides into,18 branches. The sum of the currents through the switches is equal to the current in the terminal 428 because no transformer is used. It could also be noted that, in the absence of a ground fault, the current returning through the neutral terminal 430 is equal to the current entering through the power terminal 428.

It could be noted that there is no transformer between the switch 306 and the connector 410. All power available in the power cable 404 is thus provided to the variable switch 306. The maximum available voltage that can be applied by the variable switch 306 to the motor 18A is approximately 180V DC.

Electric control signals are provided by the controller 302 through the electric link 440 to the transmitter 442 which transmits the signals wirelessly via the wireless signal 440 to the detector 446. The detector 446 transmits the signal through the electric link 448 to the variable switch 306. It can thus be seen that a controller 306 is electrically isolated from the variable switch 306 and components connected to the variable switch 306. A short causing an over-current to reach detector 446 will thus not be conducted to the controller 302. The controller 302 is thereby protected by the optocoupler 416 from an over-current on the variable switch 306 or detector 446.

The person standing on the floor 420 holds onto the handle 100. Forces can be transmitted to the person by altering currents on the voltage supply terminals of the motors of the actuation device 70. Relatively large forces can be created because of the potential to provide all the available power in the power cable 404 to one of the motors of the actuation device 70. Should a transformer be present, the transformer would saturate and the amount of power that would be provided would generally be a fraction of the maximum available power in the power cable 404.

Because of relatively high power levels provided to the motors of the actuation device 70, there is the potential that, should the person come in contact with the motors or other electrical components of the system 400, the person could be electrocuted. The nonconductive case 419 however prevents the person from gaining access to the enclosure 450 and contacting any of the electrical components. Moreover, the linkages 16 are all made of nonconductive material such as fiberglass which isolates the person holding onto the handle 100 electrically from motors and the frame 12 of the actuation device 70.

The ground fault interrupter 412 provides additional protection against electrocution. The ground fault interrupter 412 compares a supply current in the electric power cable 432 with an electric return current in the electric power return cable 434. Should the supply current differ from the return current by, for example, more than 100 milliamperes (mA), the ground fault interrupter 12 disconnects the electric power supply cable 432 from the bridge rectifier 414. In the absence of a short to neutral, through a person or otherwise, the supply current and the return current should be the same or be very close to one another. Should the difference be more than, for example, 100 mA, the likelihood would exist that there is a short to neutral and that the person can be electrocuted. By disconnecting the power supply cable 432 from the bridge rectifier 414, electrocution of the person can be prevented.

It will be required to reset the ground fault interrupter 412 once the danger of electrocution has been eliminated. Because the reset switch 418 is located externally of the enclosure 450, an operator can depress the reset switch 418. The reset switch 418 then transmits a reset signal through the electric link 456 to the ground fault interrupter 412. The ground fault interrupter 412 then again connects the electric power supply cable 432 to the bridge rectifier 414.

It can thus be seen that no transformer is used in the system 400. The additional cost, size and weight of the transformer is thereby eliminated. Regardless of the absence of a transformer which may otherwise provide protection against large electric powers which may electrocute a person, a person holding onto the handle 100 is protected from electrocution. Mechanisms included to protect the person from electrocution include the non-conductive case 419, the non-conductive material of the linkages 16, and the inclusion of the ground fault interrupter 412. It should be noted that other embodiments may include other protection mechanisms, such as for example fuses.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

For example, the rotor 108 includes a plurality of planar rotor components 130. Another embodiment may have a planar disk rotor including an outer disk rotor component and an inner disk rotor component, the rotor components thus being concentrically located, one within the other. Such an arrangement could use magnet arrangements located concentrically within one another.

Another embodiment could use magnet arrangements located concentrically within one another and being radially polarized. A respective cylindrical rotor component could be inserted in a respective rotor gap between a respective outer and a respective inner magnet arrangement.

Utilizing concentric rings of magnets have the disadvantage of large flux density changes. In the present embodiment, the flux density remains relatively constant through all the rotor components.

The present embodiment also utilized universal joints that have the advantage that they are less expensive to manufacture than, for example, constant-velocity joints. Constant-velocity joints, by contrast, have the advantage that they do not cause the typical 1-3% variation in angular velocity associated with universal joints. However, the change in velocity of the universal joints can be compensated for by a control system controlling the rotation speed of the motors.

Furthermore, the present invention utilizes electromagnets because of better performance. Permanent magnets could alternatively be used to reduce cost and/or power consumption.

It is also possible to construct the invention without brakes 20A, 20B, 20C, 20D, 26A and 26B when large braking forces (compared to the necessary actuation forces) are not required.

It is also possible to construct the invention by eliminating one paired motor and brake subsystem 18A and 20A, 18B and 20B, 18C and 20C, or 18D and 20D.

It is also possible to construct the invention by attaching frame 12 to floor 420 instead of wall 422.

What is claimed:

1. A force reflection system comprising:
   a building structure;
   an electric power cable mounted to the building structure and carrying a voltage having a maximum supply voltage level;
   a power outlet mounted to the building structure and connected to the electric power cable so that the power outlet is substantially at the voltage level of the power cable;
   a support frame located in a stationary relationship relative to the building structure;
   a linkage mechanism having a first portion and a second portion being movable relative to the first portion, the first portion being mounted to the frame;
   a user interface device having a component secured to the second portion of the linkage mechanism, and having a surface shaped for contact by a body part of a person, movement of the second portion of the linkage mechanism relative to the first portion thereof causing movement of the user interface device relative to the frame;
   an electric motor having a motor body, an actuating component, an electric voltage supply terminal, wherein, when a current is applied to the supply terminal, the actuating component is caused to move relative to the motor body, the motor being connected between two components of the frame and the linkage mechanism such that movement of the actuating component causes movement of the second portion of the linkage mechanism relative to the first portion thereof with a corresponding movement of the user interface device relative to the frame and the holding structure;
   a connector connected to the power outlet; and
   an electric power supply link connecting the connector to the supply terminal so that the supply terminal is a at voltage level which is at least 70% of the maximum supply voltage level.

2. The system of claim 1 wherein the voltage of the supply terminal is at least 80% of the maximum supply voltage level.

3. The system of claim 1 wherein the voltage of the supply terminal is at least 90% of the maximum supply voltage level.

4. The system of claim 1 wherein the voltage of the electric power cable is an alternating voltage and the electric power supply link includes a rectifier which converts the alternating voltage to a more constant voltage, and at least one variable switch between the bridge rectifier and the terminal, the system further comprising a controller which alters the switch so as to alter the current to the terminal.

5. The system of claim 4 further comprising an optocoupler having a transmitter that emits a wireless signal and a detector receiving the wireless signal, the transmitter being connected to the controller so that a signal from the controller is wirelessly emitted by the transmitter and received by the detector, the detector being connected to the variable switch so that the variable switch is altered by the signal.

6. The system of claim 1 further comprising:
   an electric neutral cable, the electric motor having a current return terminal connected to the electric neutral cable; and
   a ground fault interrupter connected between the electric power cable and the electric neutral cable, the interrupter disconnecting the electric power cable from the motor when there is a predetermined difference in magnitude between the supply current in the power cable and the return current in the electric neutral cable.

7. The system of claim 1 wherein the person is electrically isolated from electric power supply link.

8. The system of claim 7 wherein the linkage mechanism includes at least one nonconductive member which isolates the user interface device electrically from the frame.

9. The system of claim 1 further comprising a nonconductive case located over the motor so as to prevent the person from contacting electric power supply link.

10. The system of claim 9 wherein the case is located over the frame.

11. The system of claim 9 wherein the case has an opening, the linkage mechanism passing through the opening.

12. A force reflection system comprising:

a building structure;

an electric power cable mounted to the building structure;

a power outlet mounted to the building structure and connected to the electric power cable so that the power outlet carries a current from the power cable;

a support frame located in a stationary relationship relative to the building structure;

a linkage mechanism having a first portion and a second portion being movable relative to the first portion, the first portion being mounted to the frame;

a user interface device having a component secured to the second portion of the linkage mechanism, and having a surface shaped for contact by a body part of a person, movement of the second portion of the linkage mechanism relative to the first portion thereof causing movement of the user interface device relative to the frame;

a plurality of electric motors, each having a motor body, an actuating component, an electric voltage supply terminal, wherein, when a current is applied to the supply terminal, the actuating component is caused to move relative to the motor body, the motor being connected between two components of the frame and the linkage mechanism such that movement of the actuating component causes movement of the second portion of the linkage mechanism relative to the first portion thereof with a corresponding movement of the user interface device relative to the frame and the holding structure;

a connector connected to the power outlet; and an electric power supply link connecting the connector to the supply terminal so that a sum of currents to the supply terminals of all the electric motors is less than 150% of the current in the power outlet.

13. The system of claim 12 wherein the sum of the currents is less than 120% of the current in the power outlet.

14. A force reflection system comprising:

a support frame;

a linkage mechanism having a first portion and a second portion being movable relative to the first portion, the first portion being mounted to the frame;

a user interface device secured to the second portion of the linkage mechanism and having a surface shaped for contact by a body part of a person, movement of the second portion of the linkage mechanism relative to the first portion thereof causing movement of the user interface device relative to the frame;

an electric motor having a motor body and an actuating component, and an electric voltage supply terminal wherein, when a current is applied to the supply terminal, the actuating component is caused to move relative to the motor body, the motor being connected between two components of the frame and the linkage mechanism such that movement of the actuating component causes movement of the second portion of the linkage mechanism relative to the first portion thereof with a corresponding movement of the user interface device relative to the frame;

a nonconductive case over the electric motor, the case preventing the person from contacting the motor and having an opening formed therein, the linkage mechanism passing through the opening.

15. The system of claim 14 further comprising a variable switch in the power supply link, the switch being covered by the case.

16. The system of claim 14 further comprising:

a building structure, the frame being located in a stationary relationship relative to the building structure so that the user interface device moves relative to the building structure and the frame.

17. A force reflection system comprising:

a support frame;

a linkage mechanism having a first portion and a second portion being movable relative to the first portion, the first portion being mounted to the frame;

a user interface device secured to the second portion of the linkage mechanism and having a surface shaped for contact by a body part of a person, movement of the second portion of the linkage mechanism relative to the first portion thereof causing movement of the user interface device relative to the frame;

an electric motor having a motor body and an actuating component, and an electric voltage supply terminal wherein, when a voltage is altered on the supply terminal, the actuating component is caused to move relative to the motor body, the motor being connected between two components of the frame and the linkage mechanism such that movement of the actuating component causes movement of the second portion of the linkage mechanism relative to the first portion thereof with a corresponding movement of the user interface device relative to the frame;

a connector for connection to a power outlet;

an electric power supply link connecting the connector to a power supply terminal of the motor;

an electric power return link connecting a current return terminal of the motor to the connector; and a ground fault interrupter connected between the electric power supply and return links, the interrupter disconnecting the connector from the power supply terminal when there is a predetermined difference in magnitude between the supply current in the electric current supply link and the return current in the electric current return link.

18. The system of claim 14 wherein the interrupter is mounted to the frame.

* * * * *